United States Patent
Su et al.

(10) Patent No.: US 9,489,709 B2
(45) Date of Patent: Nov. 8, 2016

(54) REAL-TIME STATE-MACHINE IMPLEMENTED WITH MICRO-CONTROLLER

(71) Applicant: KYOCERA Document Solutions Inc., Osaka (JP)

(72) Inventors: Dongpei Su, El Segundo, CA (US); Masayoshi Nakamura, El Segundo, CA (US); Christa Neil, El Segundo, CA (US); Kenneth A. Schmidt, El Segundo, CA (US)

(73) Assignee: KYOCERA Document Solutions Inc. (JP)

( * ) Notice: Subject to any disclaimer, the term of this patent is extended or adjusted under 35 U.S.C. 154(b) by 48 days.

(21) Appl. No.: 14/671,332

(22) Filed: Mar. 27, 2015

(65) Prior Publication Data
US 2016/0284042 A1 Sep. 29, 2016

(51) Int. Cl.
*G06T 1/00* (2006.01)
*G06T 1/20* (2006.01)

(52) U.S. Cl.
CPC ............. *G06T 1/20* (2013.01); *G06T 2200/28* (2013.01)

(58) Field of Classification Search
CPC ........ G06F 9/444; G06F 15/825; G06F 8/40; G05B 2219/23289; G06T 11/00; G06T 15/205
See application file for complete search history.

(56) References Cited

U.S. PATENT DOCUMENTS

| | | | | |
|---|---|---|---|---|
| 2005/0035784 A1* | 2/2005 | Gould | ..................... | G06F 9/444 326/46 |
| 2009/0307175 A1* | 12/2009 | Francesco | ............... | G06F 9/444 706/48 |
| 2014/0279796 A1* | 9/2014 | Dlugosch | .......... | G06F 15/17362 706/46 |

* cited by examiner

*Primary Examiner* — Hau Nguyen
(74) *Attorney, Agent, or Firm* — McDonnell Boehnen Hulbert & Berghoff LLP

(57) ABSTRACT

A system and method for implementing a real-time state machine with a microcontroller is disclosed. The method includes using a two-stage process, including a configuration stage and a run-time stage, for processing objects for a printing device. The configuration stage is executed prior to the run-time stage, which operates in real-time. During the configuration stage, the system predetermines a state transition list, devices that need to be monitored, devices that need to be controlled, and other variables used during the run-time stage. Once the configuration stage is complete, the system executes the run-time stage in real-time to complete processing of an object for a printing device. By pre-calculating items during the configuration stage, the system reduces the execution time of the run-time stage in real-time. As a result, the performance of the microcontroller in real-time is enhanced.

20 Claims, 10 Drawing Sheets

REAL-TIME STATE-MACHINE IMPLEMENTED WITH MICRO-CONTROLLER

BACKGROUND

In recent years, demand has risen for a variety of computing devices, including computers, desktops, laptops, servers, printers, scanners, copiers, fax machines, multi-function printing devices, and/or other computing devices. For these different computing devices, many types of hardware can be used by the computing device to execute tasks. One type of computing device hardware is a microcontroller. A microcontroller may include a processor, memory, and an input/output unit for executing tasks for a computing device. In some applications, a microcontroller may be a low-cost, flexible, high-performance option for executing tasks in a computing device.

SUMMARY

In a first aspect, a method including executing, by a microcontroller, a first stage for processing data of an object for an order including one or more objects to render a two-dimensional image, wherein each object includes image data for the two-dimensional image, wherein the first stage includes determining a plurality of intermediate variables; generating, for the object, a state transition list based on the plurality of intermediate variables, wherein the state transition list includes a plurality of predetermined states, wherein each predetermined state is associated with a predetermined action; determining, for each predetermined state, from one or more devices associated with the microcontroller, a first subset of devices to monitor for device status; and determining, for each predetermined state, from the one or more devices associated with the microcontroller, a second subset of devices to control; executing, by the microcontroller, a second stage for processing data of the object, the second stage including determining a current predetermined state based on the state transition list; determining the device status for the first subset of devices for the current predetermined state; sending outputs to the second subset of devices for the current predetermined state; executing the predetermined action for the current predetermined state based on the state transition list and the device status for the first subset of devices for the current predetermined state; determining a next predetermined state based on the state transition list; and proceeding to the next predetermined state after completing execution of the predetermined action of the current predetermined state.

In a second aspect, a non-transitory computer readable medium storing executable instructions, wherein executing the instructions causes one or more processors of a microcontroller to execute a method including executing, by one or more processors of a microcontroller, a first stage for processing data of an object for an order including one or more objects to render a two-dimensional image, wherein each object includes image data for the two-dimensional image, wherein the first stage includes determining a plurality of intermediate variables; generating, for the object, a state transition list based on the plurality of intermediate variables, wherein the state transition list includes a plurality of predetermined states, wherein each predetermined state is associated with a predetermined action; determining, for each predetermined state, from one or more devices associated with the one or more processors, a first subset of devices to monitor for device status; and determining, for each predetermined state, from the one or more devices associated with the one or more processors, a second subset of devices to control; executing, by the one or more processors, a second stage for processing data of the object, the second stage includes determining a current predetermined state based on the state transition list; determining the device status for the first subset of devices for the current predetermined state; sending outputs to the second subset of devices for the current predetermined state; executing the predetermined action for the current predetermined state based on the state transition list and the device status for the first subset of devices for the current predetermined state; determining a next predetermined state based on the state transition list; and proceeding to the next predetermined state after completing execution of the predetermined action of the current predetermined state.

In a third aspect, a computing device including one or more processors; a memory storing executable instructions, wherein executing the instructions causes the one or more processors to execute a method including executing, by the one or more processors, a first stage for processing data of an object for an order including one or more objects to render a two-dimensional image, wherein each object includes image data for the two-dimensional image, wherein the first stage includes determining a plurality of intermediate variables; generating, for the object, a state transition list based on the plurality of intermediate variables, wherein the state transition list includes a plurality of predetermined states, wherein each predetermined state is associated with a predetermined action; determining, for each predetermined state, from one or more devices associated with the one or more processors, a first subset of devices to monitor for device status; and determining, for each predetermined state, from the one or more devices associated with the one or more processors, a second subset of devices to control; executing, by the one or more processors, a second stage for processing data of the object, the second stage including determining a current predetermined state based on the state transition list; determining the device status for the first subset of devices for the current predetermined state; sending outputs to the second subset of devices for the current predetermined state; executing the predetermined action for the current predetermined state based on the state transition list and the device status for the first subset of devices for the current predetermined state; determining a next predetermined state based on the state transition list; and proceeding to the next predetermined state after completing execution of the predetermined action of the current predetermined state.

These, as well as other aspects, alternatives, and advantages, will become apparent to those of ordinary skill in the art by reading the following detailed description, with reference where appropriate to the accompanying drawings.

DETAILED DESCRIPTION

Figure 1A:
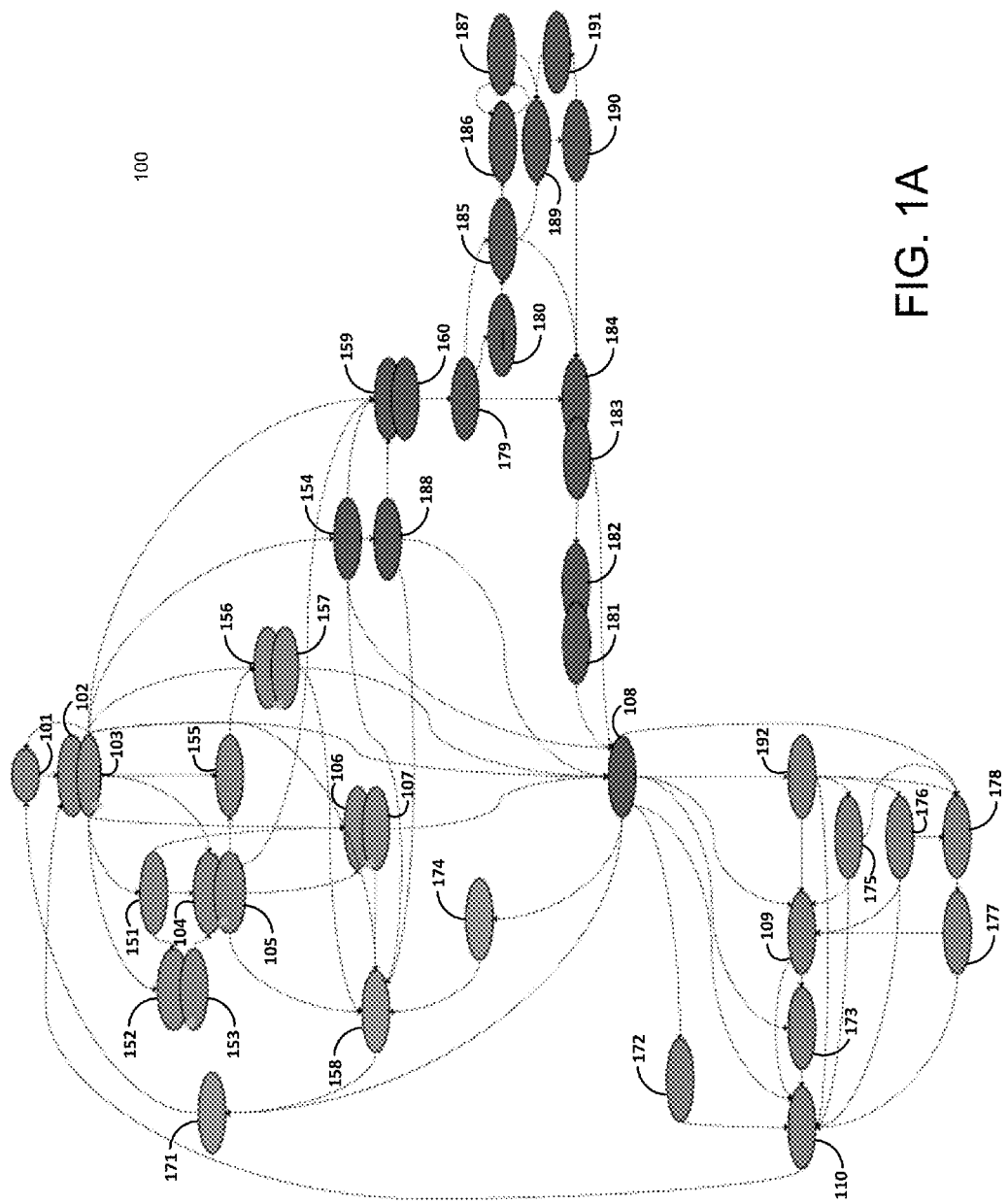
FIG. 1A illustrates an example state transition diagram.

In the following detailed description, reference is made to the accompanying figures, which form a part hereof. It should be understood, however, that the arrangements described herein are set forth as examples only. As such, those skilled in the art will appreciate that other arrangements and elements (e.g., machines, interfaces, functions, orders of functions, etc.) can be used instead or in addition. Further, many of the elements described herein are functional entities that may be implemented as discrete or distributed components or in conjunction with other components, and in any suitable combination and location. Various functions described herein as being performed by one or more entities may be carried out by hardware, firmware or software logic. For instance, various functions described herein may be carried out by a processor executing instructions written in any suitable programming language and stored in memory.

In this description, the articles "a" or "an" are used to introduce elements of the example embodiments. The intent of using those articles is that there is one or more of the elements. The intent of using the conjunction "or" within a described list of at least two terms is to indicate any of the listed terms or any combination of the listed terms. The use of ordinal numbers such as "first," "second," "third" and so on is to distinguish respective elements rather than to denote a particular order of those elements.

I. OVERVIEW

Printing devices rely on various types of hardware to execute tasks related to processing documents for printing. One type of hardware includes application specific integrated circuits (ASIC). An ASIC can be configured to execute specific tasks. One benefit of an ASIC is that an ASIC can execute many tasks in parallel (executing multiple tasks concurrently). For example, an ASIC can evaluate thousands of static variables concurrently. As a result, the computing power of an ASIC can cause excellent performance of a printing device and other associated devices.

However, a drawback of an ASIC is that it lacks flexibility. In particular, the functionality of the ASIC cannot be modified once it is configured. As a result, if the configuration of the ASIC needs to be revised to execute different tasks, then the ASIC may need to be replaced. Replacing the ASIC may be expensive and/or time-consuming. Reasons that the ASIC may need to be re-configured include protocol changes, improved functionality, correction of defects, modified designs, or other reasons.

An alternative type of hardware that can be used by a printing device to execute document processing tasks for printing is a microcontroller. A microcontroller is a low-cost hardware device that can be configured to execute tasks. The microcontroller may include a processor, a memory, and input/output devices. The microcontroller completes the specific tasks for which it's configured by using the processor to execute software instructions stored on the memory.

One benefit of a microcontroller is flexibility. In particular, if the configuration of a microcontroller needs to be modified for the microcontroller to execute different tasks, then the configuration can be altered by modifying the software stored at the microcontroller. For example, if the microcontroller needs to be reconfigured due to protocol changes, software bug correction, improved functionality, modified designs, or some other reason, one way the microcontroller can be reconfigured is by downloading and/or storing updated software at the microcontroller. Hardware may not need to be replaced. As a result, configuration modification of the microcontroller may be inexpensive. Thus, the microcontroller is a flexible hardware implementation for a printing device.

One drawback of a microcontroller is performance. In particular, the execution of tasks by a microcontroller is sequential in nature, whereas an ASIC can execute many tasks in parallel. As a result, for operations requiring many tasks to be executed in real-time, an ASIC may execute the tasks noticeably faster than a microcontroller because the ASIC can execute the tasks in parallel, while the microcontroller executes the task sequentially.

The system and method of this disclosure improves the real-time performance of tasks by a microcontroller. In particular, the microcontroller implements a two-stage solution for executing tasks in real-time. Specifically, the microcontroller executes a run-time stage in real-time after executing a configuration stage. Because the configuration stage is completed prior to real-time execution of the application (e.g., the run-time stage), the real-time performance of the microcontroller can be measured based on the run-time stage.

During the configuration stage, the microcontroller evaluates static conditions, branches, and actions to generate a state transition list, pre-evaluated status masks, and pre-evaluated control masks. The microcontroller may also evaluate static objects and/or variables during the configuration stage. During the run-time stage, the microcontroller executes predetermined actions based on the generated state transition list, status masks, and control masks. The microcontroller may also evaluate dynamic objects and/or variables during the run-time stage. A dynamic variable may be a variable that is evaluated during runtime, such as a device status. Because the configuration stage is executed prior to the run-time stage, the real-time performance of the microcontroller is improved.

While the system and method disclosed can be applied to various computing devices, in the embodiments displayed in FIGS. 1A-6C, the system and method is described for a printing device using a microcontroller. Additionally, for the embodiments displayed in FIGS. 1A-6C, the system and method described is applied for a two-dimensional, image rendering application for a printing device. However, in other embodiments, the system and method disclosed may be applied to applications. Also, the system and method disclosed may be executed by different computing devices. Further, the system and method may be executed by hardware other than a microcontroller.

FIG. 1A displays a state transition diagram of state machine 100. The state machine 100 of FIG. 1A may be executed in real-time without a two-stage execution. In the displayed embodiment of FIG. 1A, the state machine 100 corresponds to processing an order for rendering a two-dimensional image. The order includes one or more objects containing image data. However, in other embodiments, the state machine 100 could be for different objects, orders, and/or applications.

The state machine 100 includes states 101-110, 151-160, and 171-192. Each state is represented as a shaded oval. States 101-110 correspond to states that are executed in real-time. States 151-160 and 171-192 correspond to states that can be pre-evaluated prior to real-time execution of the state machine 100. States 151-160 are states that could follow state 103, which is discussed in further detail in FIG. 1C. For each state, a portion of software code may be stored in a memory of a computing device for executing the state.

The arrows between two states in FIG. 1A represent possible transitions from one state to another state. For example, state 179 includes three arrows, one of which points to state 180, another of which points to state 184, and the last of which points to state 185. Thus, depending on the execution of state 179, the very next state could be state 180, state 184, or state 185. In some cases, a state may only have one arrow pointing from the state to a next possible state. For example, state 101 only has one arrow pointing from state 101 to state 102. This arrow indicates that state 102 may be the only state that can follow state 101. Thus, when state 101 is complete, execution proceeds to state 102.

Alternatively, transitions between two states may be shown by shaded bubbles overlapping. For example, states 102 and 103 have overlapping ovals. In this case, state 102 is executed first, followed by state 103. When states overlap, the state that has arrows pointing to the state may be the first of the overlapping states to be executed. The state that contains arrows pointing away from the state may be the second of the overlapping states to be executed. Thus, for overlapping pairs of states 102 and 103, 104 and 105, and 106 and 107, states 103, 105, and 107 may follow the execution of states 102, 104, and 106, respectively.

FIG. 1A can be used to illustrate the problem with changing real-time execution of a state machine from an ASIC to a microcontroller. In particular, changing the hardware may significantly reduce the real-time execution performance of the state machine 100. As mentioned earlier, an ASIC can be configured to evaluate thousands of static object variables in parallel. As a result, the state machine in FIG. 1A, which contains numerous states and transitions, can be evaluated in real-time quickly by an ASIC that executes many tasks in parallel. In particular, the states may be evaluated to determine which transitions to use to determine the next states to evaluate. For example, state 179 may be evaluated to determine if the next state is state 180, state 184, or state 185. An ASIC can evaluate states 179, 180, 184, 185, and/or other states in parallel. As a result, the real-time performance of the state machine 100 is enhanced.

A microcontroller, however, executes tasks serially. Thus, the microcontroller may execute state 179. While executing state 179, the microcontroller may then determine if state 180, state 184, or state 185 follows state 179. After executing state 179, the microcontroller then executes one of state 180, state 184, or state 185, depending on the results of executing state 179. While executing one of state 180, state 184, or state 185, the microcontroller may also determine the state that follows execution of state 180, state 184, or state 185. This serial execution of states would apply for many, and possibly all, of the states and/or transitions displayed in state machine 100. As a result, the execution of state machine 100 in real-time by the microcontroller would likely be significantly longer than real-time execution of the state machine 100 by an ASIC.

Figure 1B:
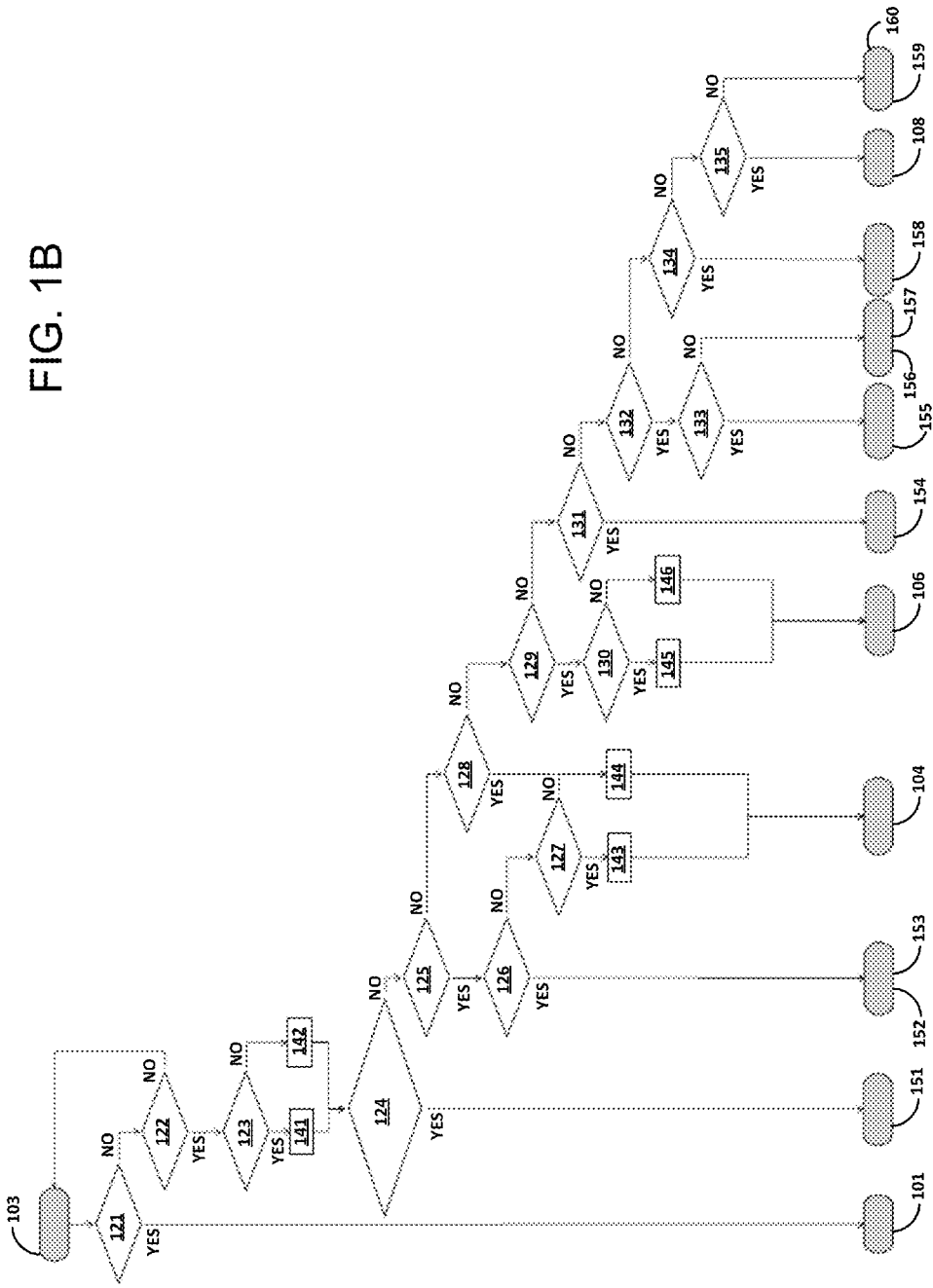
FIG. 1B illustrates an example flow chart of a state action determination.

FIG. 1B shows an example diagram displaying state action determination for state 103. FIG. 1B includes states 101, 103, 104, 106, 108, and 151-160. FIG. 1B also includes conditionals 121-135 and tasks 141-146. In some embodiments, FIG. 1B may include more, fewer, and/or different states, tasks, and/or conditionals than those displayed in FIG. 1B.

As seen in FIG. 1B, determining the state that should follow a current state (e.g., state 103) may require the evaluation of many conditionals (e.g., conditionals 121-135) and the execution of one or more tasks (e.g., 141-146). For an ASIC, this evaluation may not hinder real-time performance because an ASIC can process many conditionals and tasks in parallel. However, for a microcontroller, processing numerous conditionals and tasks to determine the next state may slow down real-time performance because the microcontroller processes the tasks and conditionals serially. Thus, real-time execution of an individual state by the microcontroller may have poor performance when compared to an ASIC.

One way to address the slower performance of the microcontroller is to implement a two-stage method for executing the state machine 100 in real-time. In particular, a first stage can be used to pre-evaluate various states (e.g., states 100-110, 151-160, and 171-192) and conditions (e.g., 121-135 for state 103) prior to real-time execution of the remaining states and conditions of state machine 100. By pre-evaluating one or more of the states and conditions, the real-time execution of state machine 100 by the microcontroller can be improved.

Figure 1C:
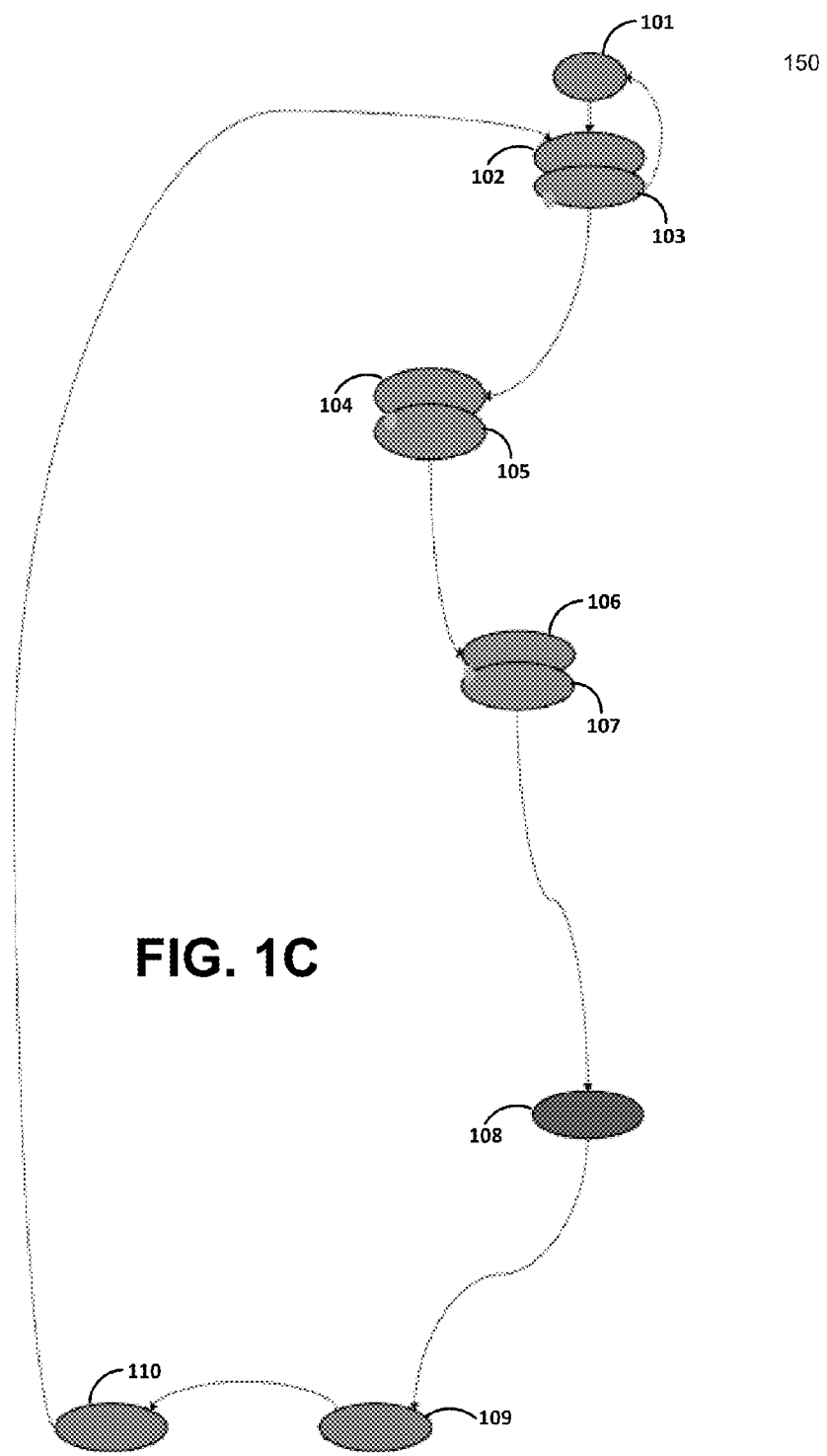
FIG. 1C illustrates an example state transition diagram.

FIG. 1C displays real-time execution of state machine 100 with a two-stage execution implemented, which results in state machine 150. State machine 150 includes states 101-110 of state machine 100. State machine 150 does not include states 151-160 and states 171-192 from state machine 100. In particular, when the two-stage execution is implemented, it may be determined during the first stage prior to real-time execution that states 151-160 and states 171-192 are not executed during real-time execution of the state machine 150. As a result, only states 101-110 are executed in real-time. Thus, state machine 150 only includes states 101-110. In some embodiments, one or more of the states 101-110, 151-160 and states 171-192 may be partially or wholly pre-evaluated prior to the real-time execution of states 101-110.

By implementing a two-stage execution, the real-time performance of a microcontroller is improved. Specifically, instead of executing the states and transitions of state machine 100 in real-time, the microcontroller only executes the states and transitions displayed in state machine 150. For example, state machine 150 only has 10 states to execute (states 101-110), whereas state machine 100 has potentially 42 states to execute (states 101-110, 151-160, and 171-192). Thus, implementing a two-stage execution can improve the real-time performance of the microcontroller by reducing the number of states and transitions to execute in real-time.

Additionally, the two-stage execution can improve the real-time performance of the microcontroller for a particular state. With reference to FIG. 1B, one or more of conditions 121-135 may be pre-evaluated prior to real-time execution. Additionally, one or more of the tasks 141-146 may also be completed prior to real-time execution. As a result, executing state 103 in real-time may include evaluating fewer, if any, of the conditionals 121-135. Furthermore, executing state 103 in real-time may include executing fewer, if any, of the tasks 141-146.

With reference to FIG. 1B, in one example, during the first stage, conditionals 121 through 125 may have been evaluated as resulting with a "no." Additionally, conditional 128 may have been evaluated with the result of "yes." Consequently, the only tasks that may need to be executed in real-time are tasks 142 and 144 before proceeding to the next state, which is state 104. In some embodiments, tasks 142 and/or 144 may be executed in real-time. In other embodiments, tasks 142 and/or 144 may be executed during the first stage prior to the real-time execution of the second stage. Thus, a two-stage execution implementation can improve real-time performance of a microcontroller by reducing the number of states and transitions to process in real-time and by decreasing the number of conditionals and/or tasks to process for a particular state.

Although FIGS. 1A and 1C display embodiments of state machines 100 and 150, in other embodiments, the state machines may include more, fewer, and/or different states and/or transitions. Other configurations of state machines are also possible.

II. EXAMPLE COMPUTING DEVICE COMPONENTS FOR A PRINTING DEVICE

Figure 2:
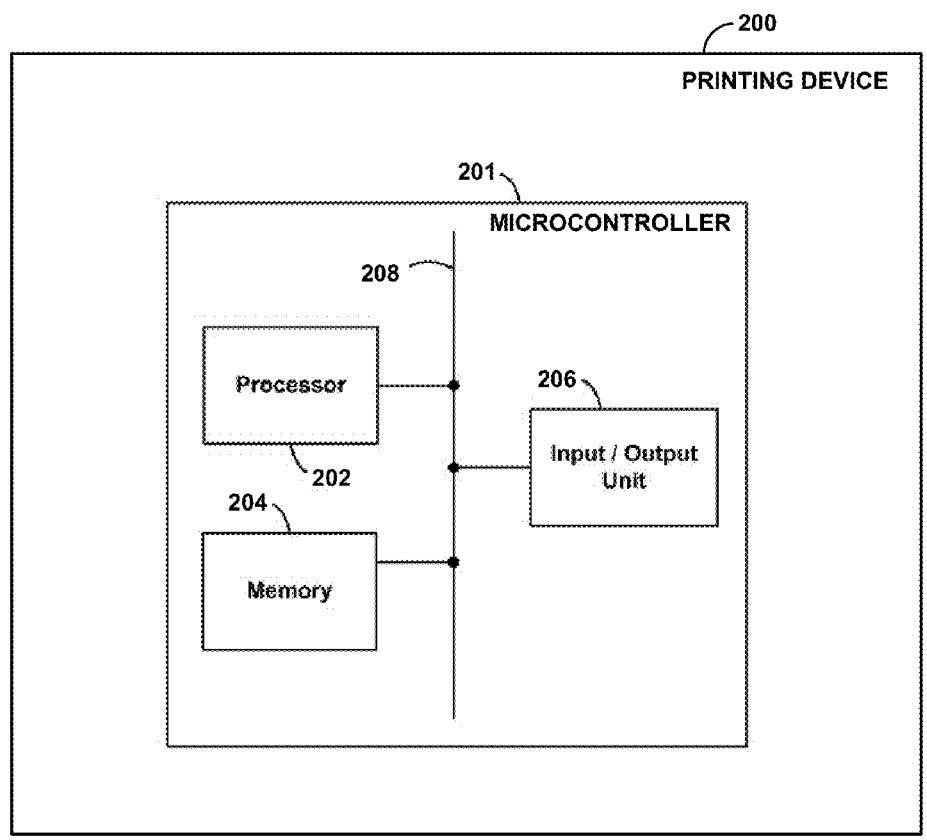
FIG. 2 illustrates an example block diagram of a computing device.

FIG. 2 depicts an example embodiment of printing device 200 with a microcontroller 201.

The microcontroller 201 may include a processor 202, memory 204 and input/output unit 206, all of which may be coupled by a microcontroller system bus 208 or a similar mechanism. Processor 202 may represent one or more processors.

Memory 204, in turn, may comprise volatile and/or non-volatile data storage and can be integrated in whole or in part with processor 202. Memory 204 may store program instructions, executable by processor 202, and data that is manipulated by the instructions to carry out the various methods, processes, or functions described herein. Alternatively, these methods, processes, or operations can be defined by hardware, firmware, and/or any combination of hardware, firmware and software. Therefore, memory 204 may include a tangible, non-transitory computer-readable medium, having stored thereon program instructions that, upon execution by one or more processors, cause the microcontroller 201 and/or printing device 200 to carry out any of the methods, processes, or functions disclosed in this specification or the accompanying drawings.

Input/output unit 206 may serve to configure and/or control the operation of processor 202 and microcontroller 201 as described in FIGS. 1A-6C. Input/output unit 206 may also provide output based on the operations performed by processor 202.

Although not displayed, the printing device 200 may include its own dedicated processor, memory, input/output unit, and/or system bus. The printing device processor may include one or more central processing units (CPUs), such as one or more general purpose processors and/or one or more dedicated processors (e.g., application specific integrated circuits (ASICs) or digital signal processors (DSPs), etc.), and/or one or more microcontrollers (e.g., microcontroller 201). The printing device processor may include microcontroller 201, however, in other embodiments, microcontroller 201 may be separate from the printing device processor. The printing device processor may include microcontrollers that are different from microcontroller 201. Other configurations of the printing device processor are also possible. The printing device 200 may be a network device, such as a client device or a server. Although not displayed, the printing device 200 may include a network interface to support communication with other devices over a network.

These examples of a printing device are provided for illustrative purposes. In addition to and/or alternatively to the examples above, other combinations and/or sub-combinations of printer and computer technologies may also exist, amongst other possibilities, without departing from the scope of the embodiments herein.

III. CONFIGURATION AND RUN-TIME STAGES

Figure 3:
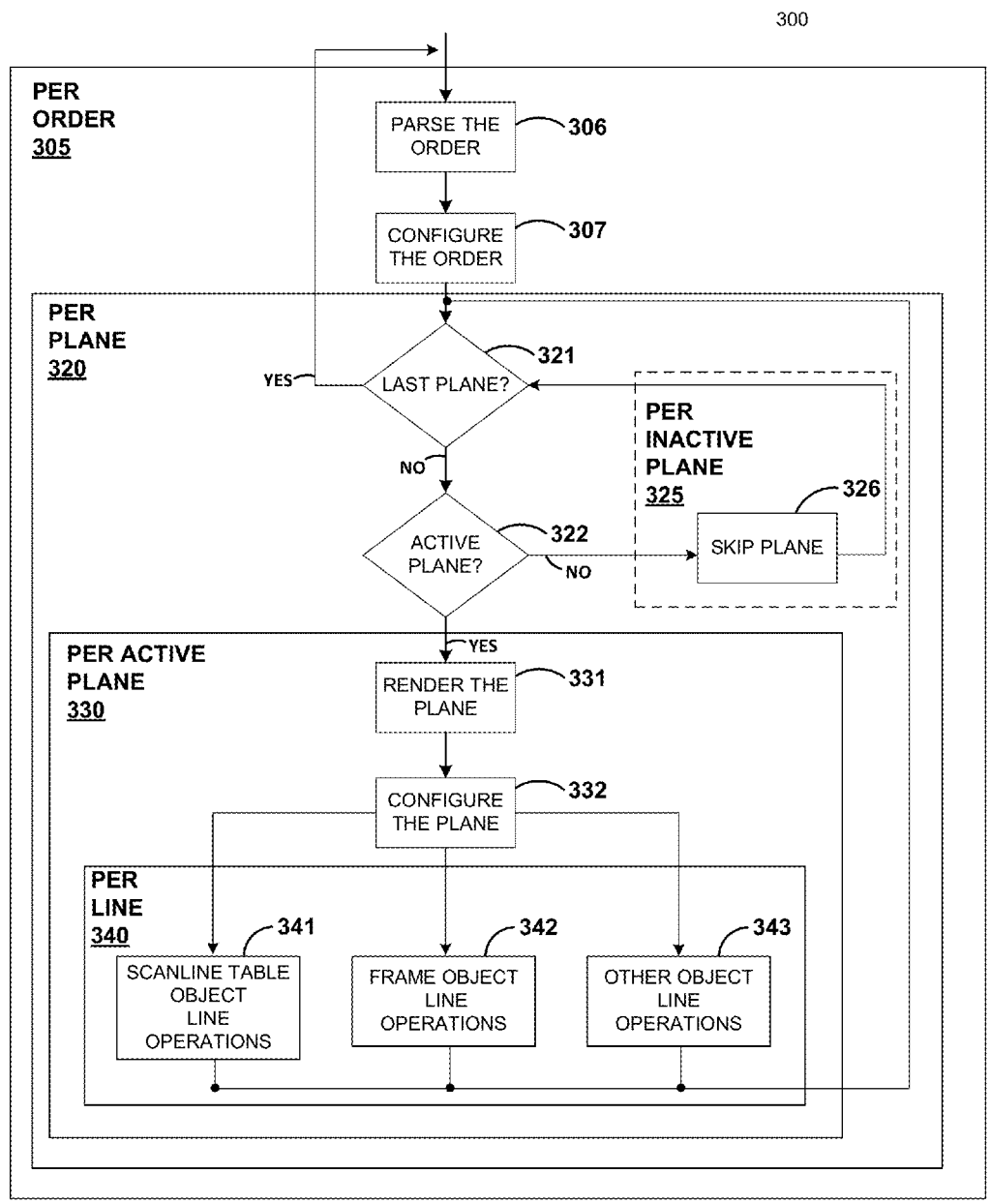
FIG. 3 illustrates an example flow chart of an example state machine implementation.

FIG. 3 is a diagram of a loop hierarchy 300 for an example state machine implementation. In FIG. 3, the processing tasks are categorized based on loop hierarchy 300. The processing tasks of FIG. 3 are associated with a job executed by the printing device 200. The job may be for rendering a two-dimensional image. However, in other embodiments, other jobs may be possible. Also, in other embodiments, a different loop hierarchy may be used. Further, a different computing device from printing device 200 may be used to execute the job.

For the embodiment displayed in FIG. 3, a printing device 200 may process a job that includes one or more pages. Each page may be described in one printer definition language (PDL). Each page may include as many as thousands of orders. Examples of orders include a letter, polygon, triangle, or vector. Other types of orders are also possible.

Each order includes one or more objects. Example objects include scanline tables, frames, trapezoids, or other objects. A scanline table object represents an arbitrary shape, while a frame object represents a rectangle. Other objects are also possible.

Each object includes one or more planes. Examples of planes include a text plane, color planes (cyan, magenta, yellow, or black), a transparency plane, a vector plane, an image plane, or a working plane. Each object may include some planes that are active and other planes that are inactive. For example, if an object is to be drawn in black and white colors, then only the black plane may be active, while the cyan, magenta, and yellow planes may be inactive. In some embodiments, an object may include as many as eight active planes.

Each object and each active plane may include one or more lines for generating the object as defined by the one or more planes. For example, a frame object (rectangular shape) that includes black portions and separate cyan portions may have lines drawn that are defined by a black plane corresponding to the black portion of the object, and lines drawn that are defined by a cyan plane corresponding to the cyan portion of the object. An object may include as many lines as needed. For example, in some cases, the object may include as many as hundreds of line segments. However, an object can include more or fewer lines. Thus, in order to draw an object, many lines may be drawn and defined by one or more planes of the object.

Processing tasks associated with a job and/or a page may be handled by a CPU of a computing device. CPU tasks may include interpreting a PDL, allocating memory, and/or other tasks for a job or one or more pages. Processing tasks associated with a particular order, objects, planes, or lines may be handled by a microcontroller, such as microcontroller 201 for printing device 200. In other embodiments, other hardware and/or computing devices may handle processing tasks associated with a job, page, object, plane, and/or line.

FIG. 3 displays a loop hierarchy 300 for tasks executed by microcontroller 201. For example, for a particular order 305, microcontroller 201 may first parse the order (see block 306) and then configure the order (see block 307). Once an order has been configured, all of the objects of the order may then be processed for the configured order. As mentioned above, each order may include one or more planes. Thus, for each object, the planes may be processed.

For a particular plane 320, a microcontroller determines whether the last plane has been processed (see block 321). If not, then the microcontroller determines if the plane is an active plane (see block 322). If the plane is inactive, the microcontroller skips the inactive plane and proceeds to process the next remaining plane. Alternatively, if no planes are remaining, then the microcontroller may process the next object. If all of the objects for a particular order have been processed, then the microcontroller may proceed to process the next order.

If the particular plane is an active plane 330, then the active plane is first rendered (see block 331) and then configured (see block 332). Once the plane is configured, line operations 340 may be executed. The line operations that are executed may depend on the type of object being processed. In FIG. 3, scanline table object line operations 341 are executed for scanline table objects. Frame object line operations 342 are executed for frame objects, while other object line operations 343 are executed for other objects.

In the embodiment displayed in FIG. 3, line operations 340 may be executed during the run-time stage in real-time. Further, tasks associated with active planes 330, inactive planes 325, all planes 320, and orders 305 may be executed during the configuration stage prior to real-time execution. By executing processing tasks associated with orders 305, planes 320, 325, and 330 during the configuration stage prior to real-time execution of the run-time stage, real-time processing by the microcontroller 201 can be improved.

While the embodiment of FIG. 3 displays various tasks (e.g., tasks 306, 307, 321, 322, 326, 331, 332, 341, 342, 343) associated with orders, planes, and lines, other tasks that are not displayed may also be associated with the orders, planes, or lines. Additionally, in some embodiments, the tasks displayed in FIG. 3 may not need to be executed, or may be executed in a different order. Additionally, different loop hierarchies are possible. For example, a loop hierarchy may include tasks executed on a per object basis.

Figure 4:
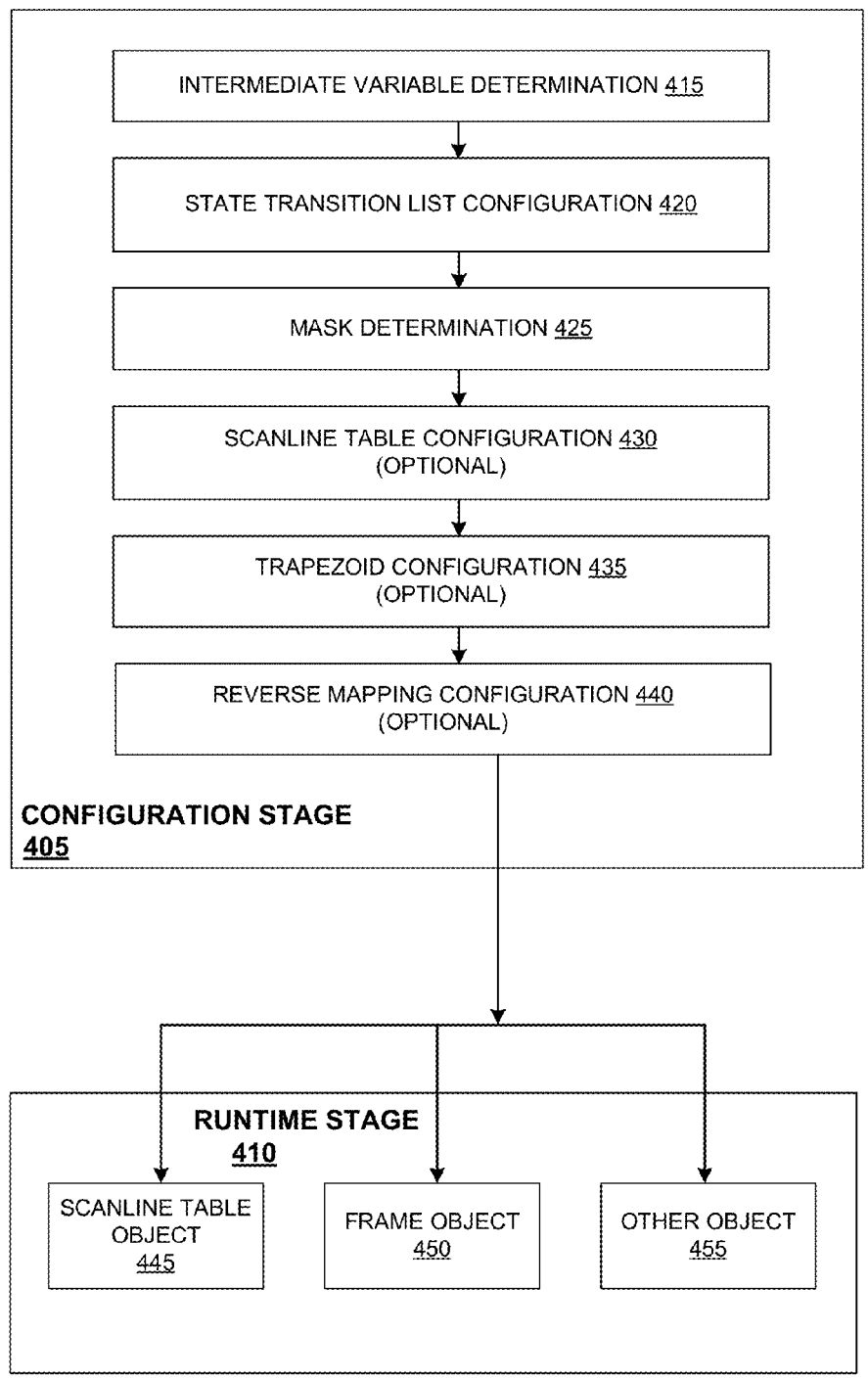
FIG. 4 illustrates an example block diagram of an example state machine implementation.

FIG. 4 illustrates an example block diagram displaying a two-stage process 400 executed by microcontroller 201 for printing device 200. In the displayed embodiment, the process 400 includes a configuration stage 405 and a run-time stage 410. By including a configuration stage 405 that is executed prior to real-time execution of the run-time stage 410, the real-time performance of the microcontroller 201 is improved. In other embodiments, the process 400 may include more stages than the two stages displayed. In particular, multiple stages may be executed prior to real-time execution of a run-time stage. Other embodiments of process 400 are also possible.

Configuration stage 405 includes several tasks that are executed prior to real-time execution of the application, which corresponds to run-time stage 410. In the displayed embodiment, configuration stage 405 includes intermediate variables determination 415, state transition list configuration 420, and mask determination 425. Additionally, the configuration stage 405 may include optional object configuration tasks, including scanline table configuration 430, trapezoid configuration 435, and reverse mapping configuration 440. In some embodiments, the configuration stage 405 may include more, fewer, and/or different tasks than those displayed in FIG. 4.

Intermediate variables are determined during task 415 of the configuration stage 405 for a particular object. Intermediate variables may include static parameters that are evaluated by the microcontroller prior to the run-time stage 410. Intermediate variables that are evaluated during step 415 may be used during other steps during configuration stage 405. For example, steps such as state transition list configuration 420, mask determination 425, scanline table configuration 430, trapezoid configuration 435, and/or reverse mapping configuration 440, may rely on one or more intermediate variables evaluated during intermediate variable determination step 415. Intermediate variables may also be relied upon during run-time stage 410.

State transition list configuration 420 generates a linked list of predetermined states for a particular object. The linked list may include a plurality of predetermined states that are executed during run-time stage 410 for a particular object. The state transition linked list may be generated during configuration stage 405 by evaluating outer loops, outer loop tasks, outer loop conditionals, and/or other loops or loop parts. For example, the list may be generated during stage 405 by executing tasks that may be considered as tasks done per order 305, per plane 320, per inactive plane 325, or per active plane 330 (see FIG. 3).

For another example, FIG. 1B may display one or more conditionals 121-135 and one or more tasks 141-146 that may be pre-evaluated during configuration stage 405 to generate a predetermined state transition list. As mentioned earlier, conditionals 121-126 may be pre-evaluated as "no" while conditionals 127 and 128 may be pre-evaluated as "yes" during stage 405. As a result, state 104 would follow state 103. By pre-evaluating the conditionals for FIG. 1B, the predetermined state transition list may now include states 103 and 104, and information indicating that state 103 precedes state 104. During the configuration stage 405, state 104 may then be pre-evaluated to pre-determine the state that should follow state 104.

For another example, FIG. 1C displays a state transition diagram of a state machine 150 that implements a two-stage execution. In particular, the state transition list for FIG. 1C may include the following states in the following order: state 101, state 102, state 103, state 104, state 105, state 106, state 107, state 108, state 109, and state 110. As mentioned earlier for FIG. 1A, each state may represent a portion of software code stored in a memory of device 200 and/or the microcontroller 201. In one embodiment, the state transition list is stored as a linked list. However, in other embodiments, the state transition list may be stored in different ways. Additionally, in other embodiments, more, fewer, and/or different states may be stored as part of the state transition list. Additionally, the states may be stored in a different order than the order shown or described for FIG. 1C.

Each predetermined state of a predetermined state transition linked list may have a predetermined action associated with it. For example, execution of the predetermined state, such as state 103, by a microcontroller may require executing a predetermined action prior to transitioning to the next state, such as state 104. Referring to FIG. 1B, the predetermined action for state 103 may be executing task 143 or task 144 prior to execution of state 104. In some embodiments, state 103 may include other tasks (not displayed) as part of the predetermined action for state 103. Alternatively, the state 103 may include multiple predetermined actions, in some embodiments. Although not displayed in FIG. 1B, in some embodiments, a predetermined action for a particular state, such as one or more of the tasks 141-146 for state 103, may be executed without evaluating any conditionals for the state, such as conditionals 121-135 for state 103. The predetermined action may be executed during run-time stage 410. However, the predetermined action for a particular predetermined state may be determined during configuration stage 405.

In some embodiments, a predetermined action for a predetermined state may include one or more tasks. The tasks may correspond to a microcontroller sending control outputs to one or more devices. In some embodiments, the microcontroller determines that a first set of one or more devices is ready before sending control outputs to a second subset of one or more devices. While sending control outputs to one or more devices may be the predetermined action of a predetermined state in one embodiment, in other embodiments, additional tasks may be executed in addition to sending control outputs as part of the predetermined action for a predetermined state. Alternatively, a predetermined action for a predetermined state may be evaluating a conditional for the predetermined state. For example, in some embodiments, a predetermined action may be evaluating a conditional, such as conditionals 121-135 in FIG. 2B, for a particular state, such as state 103 in FIG. 2B. Other predetermined actions for a predetermined state are also possible.

A state transition list may allow hardware, such as a microcontroller, to determine the current predetermined state, one or more of the next predetermined states, and/or the final predetermined state of the state transition list for an object. A microcontroller may execute one or more predetermined actions for a predetermined state in real-time during run-time stage 410 before proceeding to execute one or more predetermined actions for a next predetermined state. In some embodiments, the microcontroller executes the corresponding predetermined actions for the predetermined states of the generated state transition list in real-time during run-time stage 410. The microcontroller may rely on intermediate variables during configuration stage 405 to determine the state transition list. The microcontroller may also rely on intermediate variables during the run-time stage 410 while executing the predetermined actions of the predetermined states of the state transition list.

During run-time stage 410, a microcontroller may first determine the current predetermined state for an object based on the state transition list. The microcontroller may then execute predetermined actions for the current predetermined state before proceeding to the next predetermined state. Once the microcontroller has completed the predetermined actions for the predetermined state, the microcontroller may use the state transition list to determine the next predetermined state. Once the next predetermined state is determined by the microcontroller, the microcontroller may set the next predetermined state as the current state, and execute the predetermined actions associated with the new current state before proceeding to another predetermined state. The microcontroller may repeat this process until encountering the final predetermined state. The microcontroller may execute the predetermined actions associated with the final predetermined state to complete processing of the object. The microcontroller may then proceed to process the next object. If all objects of an order have been processed, the microcontroller may proceed to process the next order.

By generating a state transition list during configuration stage 405, the microcontroller can improve real-time performance for processing in order. In particular, the microcontroller can use the state transition list to execute predetermined actions for predetermined states in real-time without spending time on determining future states based on unevaluated conditionals. As a result, real-time performance of the microcontroller is improved due to the streamlined run-time stage.

Mask determination 425 generates masks for each predetermined state in the state transition list. In particular, mask determination 425 may generate a status mask and a control mask for each predetermined state. In other embodiments, mask determination 425 may generate more, fewer, and/or different masks than the masks described.

The status mask may be used to indicate for a particular state which devices to monitor for status. Similarly, a control mask may be used to indicate for a particular state which devices to send control outputs to. In one embodiment, the status mask may include one or more bits, with each bit corresponding to a particular device. If the device should be monitored, the device status bit may equal 1, whereas if the device should not be monitored, then the device status bit may equal 0. Similarly, a control mask may also include one or more bits, with each bit corresponding to a particular device. If the device should receive a control output, then the corresponding device control bit may equal 1, whereas if the device should not receive a control output, then the corresponding device control bit may equal 0.

While the described embodiment uses binary values for device status and device control, in other embodiments, the device status and/or device control may have more than two possible values. For example, the device status could have values of "busy", "ready", and "error." Device control may have values of "off", "low", and "high." Other values for device status and control are also possible. Additionally, in other embodiments, the status mask and/or control mask may be implemented in a different manner. For example, the "AND" operation and/or "XOR" operation (see FIG. 5) may not be used with the status mask and/or control mask if the masks use values that are not binary.

During the run-time stage 410, the status mask may be used to determine which devices should be monitored for status. In particular, the status mask can undergo an "AND" operation with the device status input vector to generate an output vector containing bits representing the devices to monitor. The device status input vector may contain one or more bits, with each bit representing a possible device to monitor for status. The number of bits for the device status input vector may be the same as the number of bits for the status mask. Further, the bits of the status mask may correspond to the same devices as the devices represented by the bits of the device status input vector.

By using an "AND" operation with the status mask and the device status input vector, a status mask can prevent devices from being monitored by having an entry of 0 for the corresponding device status bits of the devices. Otherwise, if the status mask bit corresponding to a device has an entry of 1, and the device status input vector bit corresponding to the same device also has an entry of 1, then the "AND" operation may produce a vector with an entry of 1 for that particular device. The output vector's 1 may indicate that the particular device should be monitored for status. However, other embodiments of implementing a status mask to determine devices for monitoring are also possible.

During the run-time stage 410, the control mask may be used to determine which devices should receive control outputs. In particular, the control mask may undergo an "AND" operation with a device control input vector to generate a device control output vector containing bits representing the devices to control. The device control input vector may contain one or more bits, with each bit representing a possible device to control. The number of bits in the device control input vector may be the same as the number of bits in the control mask. The bits of the control mask may correspond to the same devices as the devices represented by the control bits of the device control input vector.

By using an "AND" operation with the control mask and the device control input vector, a control mask may prevent devices from being controlled by having an entry of 0 for the corresponding control bits of the devices. Otherwise, if the corresponding bit of the device in the control mask and device input control vector have an entry of 1, then the "AND" operation may produce a device control output vector with an entry of 1 for that particular device. The device control output vector's 1 may indicate that the particular device should be controlled. However, other embodiments of implementing a control mask to control devices are also possible.

The status mask and control mask may be determined during configuration stage 405 while the microcontroller executes outer loop tasks and conditionals. In particular, for each predetermined state of the state transition list, the microcontroller may determine, from a set of devices associated with a microcontroller, which devices need to be monitored for status and/or which devices need to be controlled. For example, with reference to FIG. 1B, the microcontroller may determine for state 103 that conditional 122 requires monitoring of a particular device status. As a result, the microcontroller, during configuration stage 405, may generate a status mask for state 103 including a value of 1 for the status mask bit corresponding to the particular device of conditional 122. For another example, with reference to FIG. 1B, the microcontroller may determine for state 103 that the task 145 includes sending a control output to a selected device. Thus, the microcontroller, during configuration stage 405, may generate a control mask for state 103 including a value of 1 for the control mask bit corresponding to the selected device. In some embodiments, the evaluation of a state during the configuration stage may cause a status mask and/or a control mask to have more, fewer, and/or different devices designated to be monitored and/or controlled by setting the corresponding bit to equal 1. In other embodiments, the control mask and status mask may be generated in a different manner. The microcontroller may also use intermediate variables during mask determination 425 to determine one or more masks (e.g., the status mask, the control mask).

By generating masks, such as the status mask and the control mask, for a particular state, the real-time execution of each state can be shortened, which improves the real-time execution performance of the microcontroller. In particular, a single "AND" operation between associated devices and the status mask or control mask indicates which devices for the particular states need to be monitored for status or controlled. As a result, the microcontroller can retrieve device status and send control outputs to devices in real-time for only the required devices. Thus, the real-time execution of a microcontroller is more efficient. Therefore, masks can improve the real-time performance of the microcontroller.

During configuration stage 405, one or more object configuration tasks may also be executed by the microcontroller. For example, the microcontroller may execute a scanline table configuration 430 for scanline table objects, a trapezoid configuration 435 for trapezoid objects, or a reverse mapping configuration 440 for reverse mapping objects. Other objects, such as frames, may also be configured during the configuration stage 405.

The tasks executed during run-time stage 410 for a particular state will depend on which object has been processed. For example, if the object is a scanline table, then the run-time stage will include execution of tasks for a scanline table object 445. Alternatively, if the object is a frame object, then the run-time stage 410 will execute tasks for a frame object 450. Alternatively, during run-time stage 410, tasks may be executed for other objects 455, such as trapezoids. The tasks may include executing the one or more predetermined states of the list determined during list configuration 420, applying the status masks or control masks determined during mask determination 425 for each predetermined state, and/or other tasks. The run-time stage 410 may be executed by the microcontroller in real-time. In other embodiments, different tasks may be executed during run-time stage 410.

IV. DEVICE STATUS DETERMINATION

Figure 5:
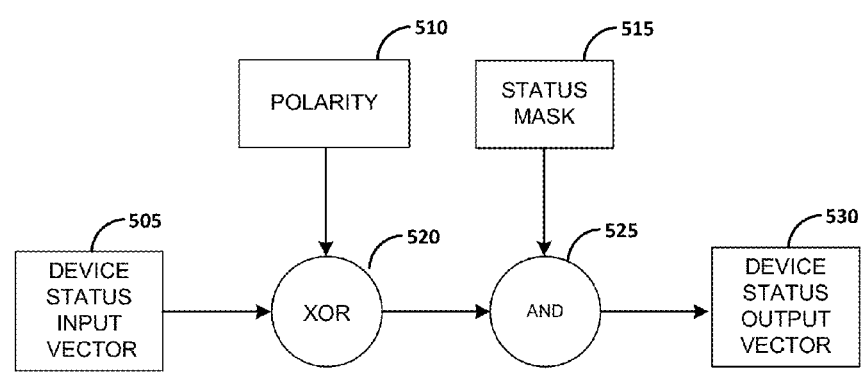
FIG. 5 illustrates an example block diagram for determining a device status output vector.

FIG. 5 illustrates an example block diagram for determining the device status of one or more devices. The device status may be determined during real-time execution of the run-time stage 410. In FIG. 5, the displayed embodiment includes a device status input vector 505, a polarity 510, a status mask 515, an "XOR" operation 520, an "AND" operation 525, and a device status output vector 530. In other embodiments, the block diagram may include more, fewer, and/or different components than those displayed in FIG. 5.

Polarity 510 may indicate one or more devices that may have their status bit inverted. Polarity 510 may include one or more bits. Each bit may correspond to a device. In the displayed embodiment of FIG. 5, polarity 510 contains as many bits as device status input vector 505. Further, the bits of polarity 510 correspond to the same devices as the bits of vector 505. Thus, polarity 510 may indicate whether any of the devices of device status input vector 505 should have their status bit inverted. For example, for polarity 510, a bit for a corresponding device can be set to 1 to indicate that the device status bit should be inverted (e.g., from 0 to 1 or from 1 to 0) for the same corresponding device of vector 505. Because polarity 510 indicates when a device status bit should be inverted, the polarity is applied to the device status input vector 505 by using an "XOR" operation 520.

There are various reasons why a status bit may be inverted. For example, in one application, a microcontroller may execute a predetermined action after determining that one or more device status inputs indicate that one or more devices are "ready." The microcontroller may rely on an "AND" operation to determine that the one or more devices are "ready." As a result, each device status input may have a device status bit of 1 to indicate that the device is "ready."

However, some devices may have a device status that indicates whether or not the device is "busy." For example, a device may have a device status bit of 1 to indicate that the device is "busy," and a device status bit of 0 to indicate that the device is idle or "ready." Thus, the microcontroller may invert the device status bit so that a device status bit of 1 corresponds to the device being idle or "ready," and the device status bit equaling 0 corresponds to the device being "busy" or unavailable. In this case, polarity 510 can indicate which devices have device status bits that can be inverted.

In FIG. 5, the microcontroller may invert one or more bits of device status input vector 505 based on polarity 510 by applying the "XOR" operation 520 on both vector 505 and polarity 510. After executing the "XOR" operation 520, the microcontroller may then apply an "AND" operation 525 to the status mask 515 and the result of the XOR operation 520 to determine the device status output vector 530. The device status output vector 530 indicates which device status values may need to be monitored. The vector 530 also modifies device status bit orientation such that a device status bit of 1 indicates that a device is "ready." The "XOR" operation 520 and "AND" operation 525 may be executed by software (e.g., run-time stage 410 code) or hardware (e.g., microcontroller hardware, computing device hardware, logic gates, and/or other hardware).

Thus, during run-time stage 410, the microcontroller may load a device status input vector 505, a polarity 510, and a status mask 515 for a particular state, apply the "XOR" operation 520 on the device status input vector 505 and the polarity 510, and apply the "AND" operation 525 on the status mask 515 and the result of the "XOR" operation 520 to generate the device status output vector 530. The microcontroller then retrieves the device status based on vector 530. The microcontroller also inverts the retrieved device status bits as needed based on vector 530. The microcontroller may then use the one or more retrieved device status values to execute the predetermined action of the predetermined state. Once the predetermined action is executed, the microcontroller may then proceed to the next state. In other embodiments, the device status, status masks, and/or polarity may be implemented or used in a manner different than what is shown in FIG. 5.

V. EXAMPLE METHODS

Figure 6A:
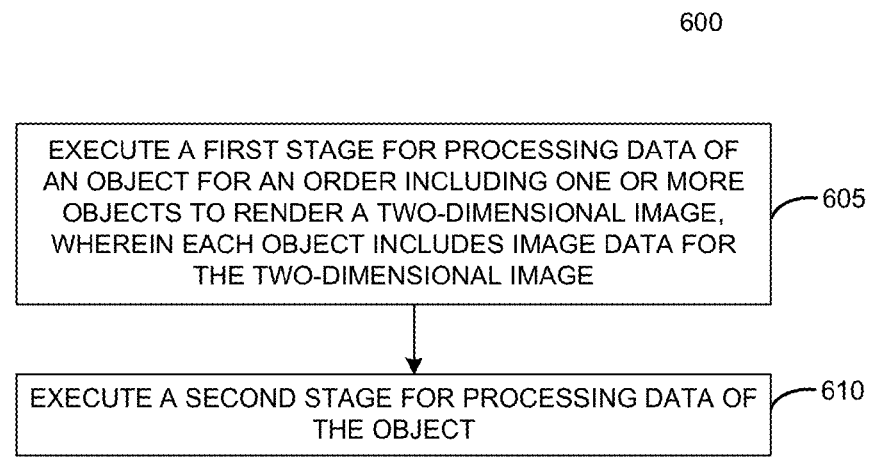
FIGS. 6A-6C are flowcharts depicting steps for implementing an example state machine.

FIG. 6A is a flow chart illustrating an example method 600 executed by a microcontroller, such as microcontroller 201. The method 600 begins with executing a first stage for processing data of an object for an order including one or more objects to render a two-dimensional image, wherein each object includes image data for the two-dimensional image, as shown by block 605. For example, with reference to FIG. 4, the first stage executed during method 600 may correspond to the configuration stage 405. The objects of the order that are processed may be a scanline table, a frame, trapezoid, or some other object. The method 600 progresses to then execute a second stage for processing data of the object, as shown by block 610. With reference to FIG. 4, for example, the second stage executed during method 600 may correspond to the run-time stage 410. During the run-time stage 410, the method 600 may execute processing for a scanline table object 445, a frame object 450, or some other object 455 (including a trapezoid).

Although FIG. 6A displays several steps for method 600, in some embodiments, method 600 may include more, fewer, and/or different steps than those displayed in FIG. 6A. For example, method 600 may include more than two stages for processing objects with image data for an order for rendering a two-dimensional image. The method 600 may include stages that are different from the first stage 605 corresponding to the configuration stage 405 of FIG. 4 and the second stage 610 corresponding to the run-time stage 410 of FIG. 4. In some embodiments, the method 600 is executed by microcontroller 201 of a computing device, such as printing device 200. However, other computing devices may include a microcontroller for executing method 600. Additionally, hardware other than a microcontroller 201 may execute the method 600.

Figure 6B:
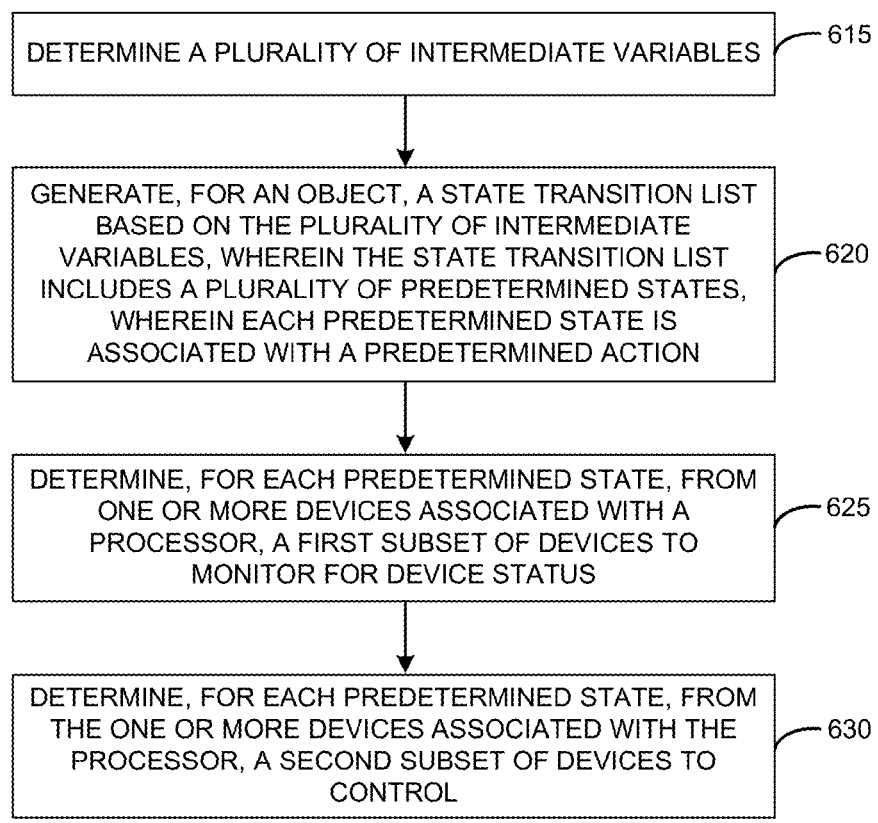

FIG. 6B is a flow chart illustrating an example method 611 for executing the first stage 605 of method 600 from FIG. 6A. Example method 611 may be executed by microcontroller 201 for a printing device 200, as shown in FIG. 2. With reference to FIG. 4, the method 611 may correspond to configuration stage 405. The method 611 may be executed as part of method 600 for processing the image data of an object for an order for rendering a two-dimensional image.

Method 611 begins with determining a plurality of intermediate variables, as shown by block 615. With reference to FIG. 4, for example, the microcontroller 201 may complete intermediate variable determination 415 during configuration stage 405. Next, method 611 may then generate, for an object, a state transition list based on the plurality of intermediate variables, wherein the state transition list includes a plurality of predetermined states, wherein each predetermined state is associated with a predetermined action, as shown by block 620. For example, with reference to FIG. 4, block 620 may correspond with state transition list configuration 420, which is executed during the configuration stage 405 by microcontroller 201.

Method 611 continues by determining, for each predetermined state, from one or more devices associated with a processor, a first subset of devices to monitor for device status, as shown in block 625. Method 611 progresses by determining, for each predetermined state, from the one or more devices associated with the processor, a second subset of devices to control, as shown in block 630. With reference to FIG. 4, both the first and the second subsets of devices may be determined during mask determination 425 during the configuration stage 405. The processor may correspond to the microcontroller 201.

Although FIG. 6B displays several steps for method 611, in some embodiments method 611 may include more, fewer, and/or different steps than those displayed in FIG. 6B. For example, method 611 could include steps for generating a status mask for the first subset of devices for each predetermined state and generating a control mask for the second subset of devices for each predetermined state. With reference to FIG. 4, both the status mask and the control mask may be determined during mask determination 425 during the configuration stage 405. Further, the steps in FIG. 6B may be performed in a different order than the order shown in FIG. 6B. In some embodiments, the method 611 is executed by a microcontroller of a printing device (e.g., microcontroller 201 of printing device 200). However, in other embodiments, a different computing device that includes a microcontroller, or a processor, may execute the method 611. Additionally, hardware other than a microcontroller may execute method 611.

Figure 6C:
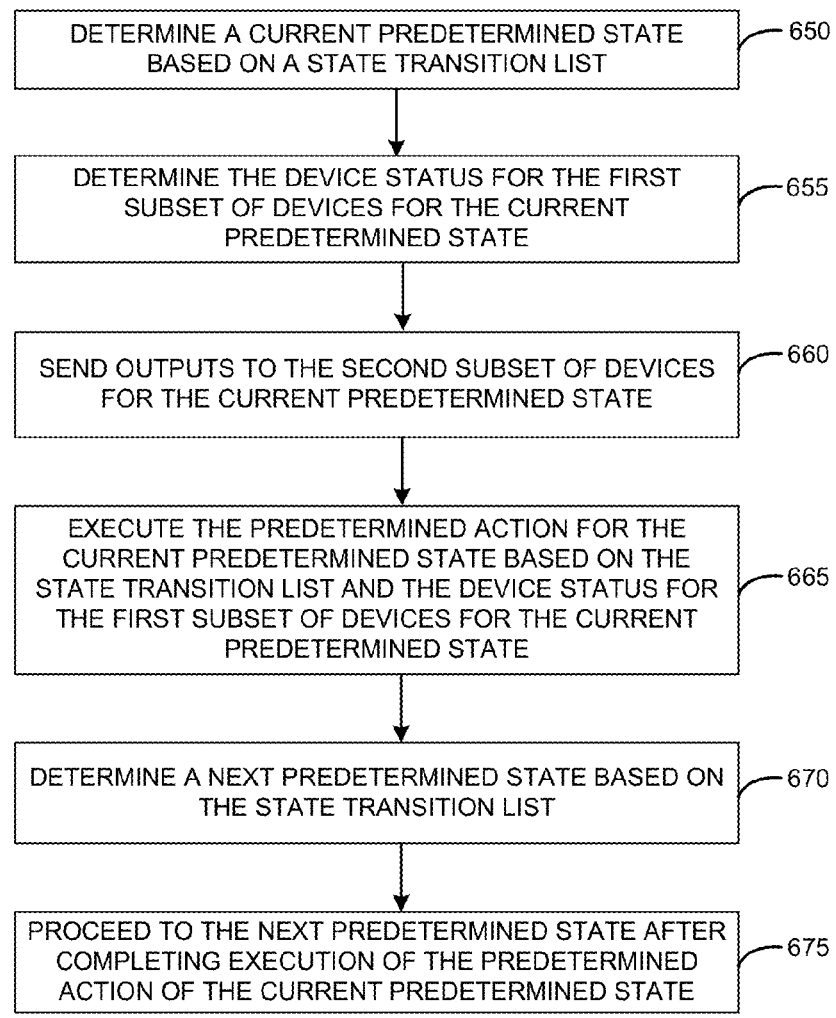

FIG. 6C is a flow chart illustrating an example method 641 for executing a second stage 610 of method 600 from FIG. 6A. Example method 641 may be executed by microcontroller 201 for a printing device 200, as shown in FIG. 2. With reference to FIG. 4, the method 641 may correspond to run-time stage 410. The method 641 may be executed as part of method 600 for processing image data of an object for an order for rendering a two-dimensional image.

Method 641 begins by determining a current predetermined state based on a state transition list, as shown by block 650. Next, method 641 continues by determining the device status for the first subset of devices for the current predetermined state, as shown by block 655. The method 641 progresses by sending outputs to the second subset of devices for the current predetermined state, as shown by block 660. The method 641 may then proceed to execute the predetermined action for the current predetermined state based on the state transition list and the device status for the first subset of devices for the current predetermined state, as shown by block 665. With reference to FIG. 4, block 650, 655, 660, and 665 of method 641 may be executed during run-time stage 410.

The method 641 may then determine a next predetermined state based on the state transition list, as shown by block 670. Next, the method may proceed to the next predetermined state after completing execution of the predetermined action of the current predetermined state, as shown by block 675. Similar to blocks 650, 655, 660, and 665, blocks 670 and 675 may also be executed during run-time stage 410, as shown in FIG. 4.

Although FIG. 6C displays several steps for method 641, in some embodiments, method 641 may include more, fewer, and/or different steps than those displayed in FIG. 6C. For example, method 641 may include steps to further determine the device status for the first subset of devices for the current predetermined state based on the status mask for the current predetermined state. Additionally, method 641 may include steps to send outputs to the second subset of devices for the current predetermined state based on the control mask for the current predetermined state. With reference to FIG. 4, these additional steps may be executed during run-time stage 410.

Further, the steps in FIG. 6C may be performed in a different order than the order shown in FIG. 6C. In some embodiments, the method 641 is executed by a microcontroller of a printing device, such as microcontroller 201 of printing device 200. However, in other embodiments, a different computing device that includes a microcontroller, or a processor, may execute method 641. Additionally, hardware other than a microcontroller may execute method 641.

VI. CONCLUSION

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent from the foregoing descriptions. Such modifications and variations are intended to fall within the scope of the appended claims.

With respect to any or all of the ladder diagrams, scenarios, and flow charts in the figures and as discussed herein, each block and/or communication may represent a processing of information and/or a transmission of information in accordance with example embodiments. Alternative embodiments may be included within the scope of such example embodiments. Further, more or fewer blocks and/or functions may be used with any of the ladder diagrams, scenarios, and flow charts discussed herein, and these ladder diagrams, scenarios, and flow charts may be combined with one another, in part or in whole.

A step or block that represents a processing of information may correspond to circuitry that can be configured to perform the specific logical functions of a herein-described method or technique. Alternatively or additionally, a step or block that represents a processing of information may correspond to a module, a segment, or a portion of program code (including related data). The program code may include one or more instructions executable by a processor for implementing specific logical functions or actions in the method or technique. The program code and/or related data may be stored on any type of computer-readable medium, such as a storage device, including a disk drive, a hard drive, or other storage media.

The computer-readable medium may also include non-transitory computer-readable media such as computer-readable media that stores data for short periods of time like register memory, processor cache, and/or random access memory (RAM). The computer-readable media may also include non-transitory computer-readable media that stores program code and/or data for longer periods of time, such as secondary or persistent long term storage, like read only memory (ROM), optical or magnetic disks, and/or compact-disc read only memory (CD-ROM), for example. The computer-readable media may also be any other volatile or non-volatile storage systems. A computer-readable medium may be considered a computer-readable storage medium, for example, and/or a tangible storage device.

Additionally, any enumeration of elements, blocks, or steps in this specification, the drawings, or the claims is for purposes of clarity. Thus, such enumeration should not be interpreted to require or imply that these elements, blocks, or steps adhere to a particular arrangement or are carried out in a particular order.

It should be understood that arrangements described herein are for purposes of example only. As such, those skilled in the art will appreciate that other arrangements and other elements (e.g., machines, interfaces, functions, orders, groupings of functions, etc.) can be used instead, and some elements may be omitted altogether according to the desired results. Further, many of the elements that are described are functional entities that may be implemented as discrete or distributed components or in conjunction with other components, in any suitable combination and location.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method comprising:
    executing, by a microcontroller, a first stage for processing data of an object for an order including one or more objects to render a two-dimensional image, wherein each object includes image data for the two-dimensional image, wherein the first stage comprises:
        determining a plurality of intermediate variables;
        generating, for the object, a state transition list based on the plurality of intermediate variables, wherein the state transition list includes a plurality of predetermined states, wherein each predetermined state is associated with a predetermined action;
        determining, for each predetermined state, from one or more devices associated with the microcontroller, a first subset of devices to monitor for device status; and
        determining, for each predetermined state, from the one or more devices associated with the microcontroller, a second subset of devices to control;
    executing, by the microcontroller, a second stage for processing data of the object, the second stage comprising:
        determining a current predetermined state based on the state transition list;
        determining the device status for the first subset of devices for the current predetermined state;
        sending outputs to the second subset of devices for the current predetermined state;
        executing the predetermined action for the current predetermined state based on the state transition list and the device status for the first subset of devices for the current predetermined state;
        determining a next predetermined state based on the state transition list; and
        proceeding to the next predetermined state after completing execution of the predetermined action of the current predetermined state.

2. The method of claim 1, further comprising:
    for the first stage, generating a status mask for the first subset of devices for each predetermined state; and for the second stage, further determining the device status for the first subset of devices for the current predetermined state based on the status mask for the current predetermined state.

3. The method of claim 2, further comprising:

for the first stage, receiving, by the microcontroller, a polarity for the first subset of devices for each predetermined state; and for the second stage, further determining the device status for the first subset of devices for the current predetermined state based on the status mask and the received polarity for the current predetermined state.

4. The method of claim 2, further comprising:

for the first stage, generating a control mask for the second subset of devices for each predetermined state; and for the second stage, sending outputs to the second subset of devices for the current predetermined state based on the control mask for the current predetermined state.

5. The method of claim 1, further comprising:

executing, by the microcontroller, the second stage, wherein the second stage further comprises:

determining a final predetermined state based on the state transition list; and executing a predetermined action for the final predetermined state based on at least the state transition list, the status mask for the final predetermined state, and the device status for the first subset of devices for the final predetermined state; and after completing execution of the first stage and second stage for processing data of the object for the order, processing a second object of the order.

6. The method of claim 5, wherein processing the second object further comprises:

executing, by the microcontroller, the first stage for processing data of the second object for the order; and executing, by the microcontroller, the second stage for processing data of the second object for the order.

7. The method of claim 6, wherein the order is processed once each of the one or more objects has been processed.

8. The method of claim 1, wherein each object includes a plurality of lines, wherein the predetermined action of the current predetermined state is for at least one line of the plurality of lines.

9. The method of claim 1, wherein the object is a trapezoid.

10. A non-transitory computer readable medium storing executable instructions, wherein executing the instructions causes one or more processors of a microcontroller to execute a method comprising:

executing, by one or more processors of a microcontroller, a first stage for processing data of an object for an order including one or more objects to render a two-dimensional image, wherein each object includes image data for the two-dimensional image, wherein the first stage comprises:

determining a plurality of intermediate variables;

generating, for the object, a state transition list based on the plurality of intermediate variables, wherein the state transition list includes a plurality of predetermined states, wherein each predetermined state is associated with a predetermined action;

determining, for each predetermined state, from one or more devices associated with the one or more processors, a first subset of devices to monitor for device status; and determining, for each predetermined state, from the one or more devices associated with the one or more processors, a second subset of devices to control;

executing, by the one or more processors, a second stage for processing data of the object, the second stage comprising:

determining a current predetermined state based on the state transition list;

determining the device status for the first subset of devices for the current predetermined state;

sending outputs to the second subset of devices for the current predetermined state;

executing the predetermined action for the current predetermined state based on the state transition list and the device status for the first subset of devices for the current predetermined state;

determining a next predetermined state based on the state transition list; and proceeding to the next predetermined state after completing execution of the predetermined action of the current predetermined state.

11. The non-transitory computer readable medium of claim 10, further comprising:

for the first stage, generating a status mask for the first subset of devices for each predetermined state; and for the second stage, further determining the device status for the first subset of devices for the current predetermined state based on the status mask for the current predetermined state.

12. The non-transitory computer readable medium of claim 11, further comprising:

for the first stage, receiving, by the one or more processors, a polarity for the first subset of devices for each predetermined state; and for the second stage, further determining the device status for the first subset of devices for the current predetermined state based on the status mask and the received polarity for the current predetermined state.

13. The non-transitory computer readable medium of claim 11, further comprising:

for the first stage, generating a control mask for the second subset of devices for each predetermined state; and for the second stage, sending outputs to the second subset of devices for the current predetermined state based on the control mask for the current predetermined state.

14. The non-transitory computer readable medium of claim 10, further comprising:

executing, by the one or more processors, the second stage, wherein the second stage further comprises:

determining a final predetermined state based on the state transition list; and executing a predetermined action for the final predetermined state based on at least the state transition list, the status mask for the final predetermined state, and the device status for the first subset of devices for the final predetermined state; and after completing execution of the first stage and second stage for processing data of the object for the order, processing a second object of the order.

15. The non-transitory computer readable medium of claim 14, wherein processing the second object further comprises:
executing, by the one or more processors, the first stage for processing data of the second object for the order; and
executing, by the one or more processors, the second stage for processing data of the second object for the order.

16. A computing device comprising:
one or more processors;
a memory storing executable instructions, wherein executing the instructions causes the one or more processors to execute a method comprising:
executing, by the one or more processors, a first stage for processing data of an object for an order including one or more objects to render a two-dimensional image, wherein each object includes image data for the two-dimensional image, wherein the first stage comprises:
determining a plurality of intermediate variables;
generating, for the object, a state transition list based on the plurality of intermediate variables, wherein the state transition list includes a plurality of predetermined states, wherein each predetermined state is associated with a predetermined action;
determining, for each predetermined state, from one or more devices associated with the one or more processors, a first subset of devices to monitor for device status; and
determining, for each predetermined state, from the one or more devices associated with the one or more processors, a second subset of devices to control;
executing, by the one or more processors, a second stage for processing data of the object, the second stage comprising:
determining a current predetermined state based on the state transition list;
determining the device status for the first subset of devices for the current predetermined state;
sending outputs to the second subset of devices for the current predetermined state;
executing the predetermined action for the current predetermined state based on the state transition list and the device status for the first subset of devices for the current predetermined state;
determining a next predetermined state based on the state transition list; and
proceeding to the next predetermined state after completing execution of the predetermined action of the current predetermined state.

17. The computing device of claim 16, further comprising:
for the first stage,
generating a status mask for the first subset of devices for each predetermined state; and
for the second stage,
further determining the device status for the first subset of devices for the current predetermined state based on the status mask for the current predetermined state.

18. The computing device of claim 17, further comprising:
for the first stage,
receiving, by the one or more processors, a polarity for the first subset of devices for each predetermined state; and
for the second stage,
further determining the device status for the first subset of devices for the current predetermined state based on the status mask and the received polarity for the current predetermined state.

19. The computing device of claim 17, further comprising:
for the first stage,
generating a control mask for the second subset of devices for each predetermined state; and
for the second stage,
sending outputs to the second subset of devices for the current predetermined state based on the control mask for the current predetermined state.

20. The computing device of claim 16, further comprising:
executing, by the one or more processors, the second stage, wherein the second stage further comprises:
determining a final predetermined state based on the state transition list; and
executing a predetermined action for the final predetermined state based on at least the state transition list, the status mask for the final predetermined state, and the device status for the first subset of devices for the final predetermined state; and
after completing execution of the first stage and second stage for processing data of the object for the order, processing a second object of the order by,
executing, by the one or more processors, the first stage for processing data of the second object for the order; and
executing, by the one or more processors, the second stage for processing data of the second object for the order.

* * * * *